United States Patent [19]
Koppens

[11] 4,298,327
[45] Nov. 3, 1981

[54] DEVICE FOR THE MANUFACTURE OF ROD-SHAPED OBJECTS OF DOUGH-LIKE, PARTICULARLY EDIBLE, MATERIAL

[75] Inventor: Wilhelmus F. A. Koppens, Bakel, Netherlands

[73] Assignee: Koppens Machinefabriek B.V., Bakel, Netherlands

[21] Appl. No.: 150,723

[22] Filed: May 19, 1980

[30] Foreign Application Priority Data
May 23, 1979 [NL] Netherlands .......................... 7904048

[51] Int. Cl.³ ............................................ A21C 11/00
[52] U.S. Cl. .................................... 425/344; 425/352
[58] Field of Search ................ 425/354, 355, 344, 352

[56] References Cited
FOREIGN PATENT DOCUMENTS
1132862 3/1957 France ................................. 425/354

*Primary Examiner*—James H. Derrington

[57] ABSTRACT

A frame comprising crossplates 8 and 13 coupled and spaced apart by coupling rods 10 (FIG. 2) faces, by the crossplates 8 and 13, opposite ends of aligned plunger pairs 7 and 16, there being a plurality of said pairs associated with respective openings, in which they are a close sliding fit, in a housing in which is a supply chamber 2 surmounted by a supply hopper 6. Reciprocation of the frame 8, 10, 13 causes movement of the plungers 7, 16 with there being a movement time lag between the plungers of the pair to provide, when within the supply chamber 2, a space between the confronting ends of said plungers 7, 16, for receiving material from the chamber 2 as an object 18 which can be ejected (e.g. by wire 21) when the said ends are outside the housing 1. This arrangement ensures consistency of shape of the product and of the location at which it engages from the device, facilitating subsequent treatment and/or handling thereof.

7 Claims, 2 Drawing Figures

DEVICE FOR THE MANUFACTURE OF ROD-SHAPED OBJECTS OF DOUGH-LIKE, PARTICULARLY EDIBLE, MATERIAL

This invention relates to a device for the manufacture of rod-shaped objects of dough-like, particularly edible material, for example, croquettes.

For the manufacture of this type of object, for example, croquettes, it is common practice to pass lumps of material between opposed movable endless belts in order to roll, into rod-shaped objects, lumps of material supplied thereto. However, various disadvantages are inherent in such known devices. The resultant products do not all have equal shapes; on the contrary, they may have highly different shapes and dimensions, which is not convenient for subsequent processing, such as packing the products.

A further disadvantage is that the products formed are fairly arbitrarily orientated and do not emerge from the device at a fixed location, which also hinders subsequent transport and processing.

The invention has for its object to provide a device of the kind above discussed, the construction of which is simple and which permits the manufacture of, objects of invariably equal shape.

According to the invention this is achieved by providing the device with a supply chamber for receiving the material and communicating with a passage in which a first plunger is adapted to reciprocate, said plunger being displaceable between a first position in which the plunger completely fills the passage and a second position in which it is located out of the passage and the supply chamber, whilst a second plunger is adapted to reciprocate in line with the first plunger and is displaceable between a first position in which the end of the second plunger facing the first plunger is located in the supply chamber and a second position in which said end of the second plunger has passed through said passage and is also located outside the supply chamber, the plungers being so driven that, when the first plunger is displaced in a given direction, the second plunger is displaced in the same direction after a given time delay.

When using a device of the kind set forth the cross-section of the product obtained will always be equal to the diameter of the passage or to the diameters of the plungers fitting therein, whilst the length of the product will invariably be equal to the distance by which the second plunger lags behind the first plunger. The co-operation between the plungers prevents air from getting into the supply chamber containing the material, which is important for avoiding air occulusions which would adversely affect the formation of correctly composed products.

When the device according to the invention is employed, the formed product always becomes available at the same location which facilitates subsequent transport and/or processing.

The invention will be described further, by way of example, with reference to the accompanying drawings which illustrate a preferred embodiment of the device according to the invention schematically. In the drawings.

Figure 1:
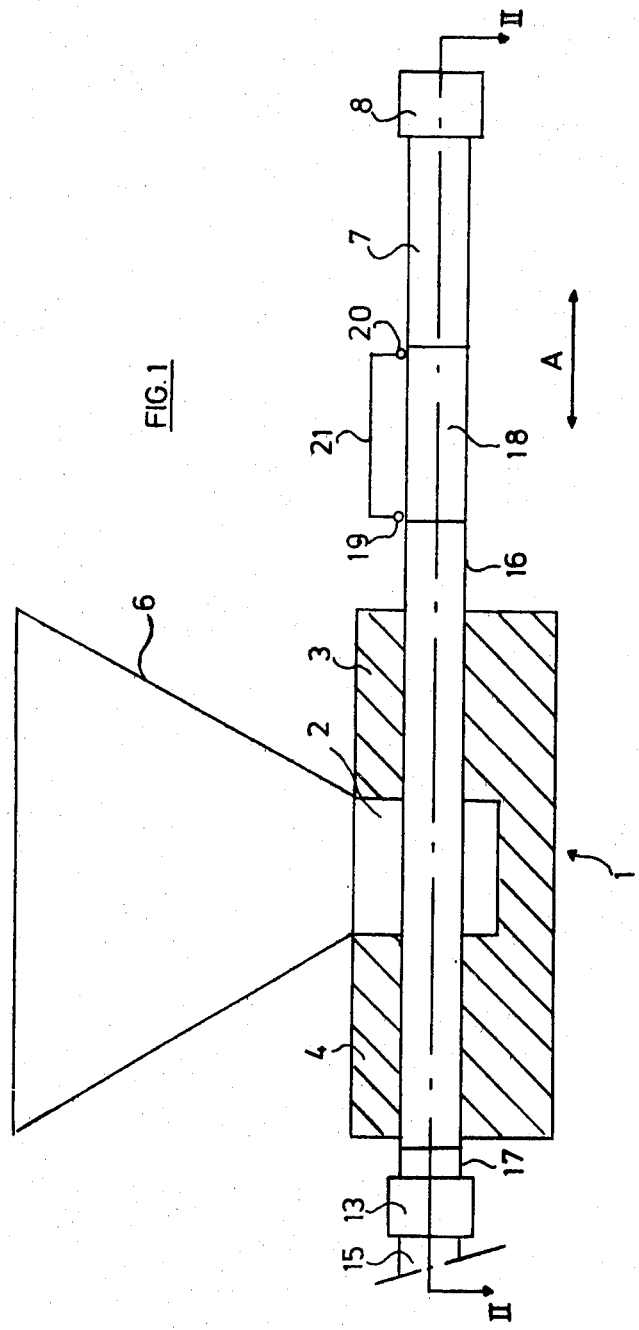
FIG. 1 is a schematic sectional elevation of the said embodiment.

The device illustrated schematically in the drawings comprises a housing 1 having a supply chamber 2, which is bounded at opposite sides by sidewalls 3 and 4 respectively, forming parts of the housing 1.

Figure 2:
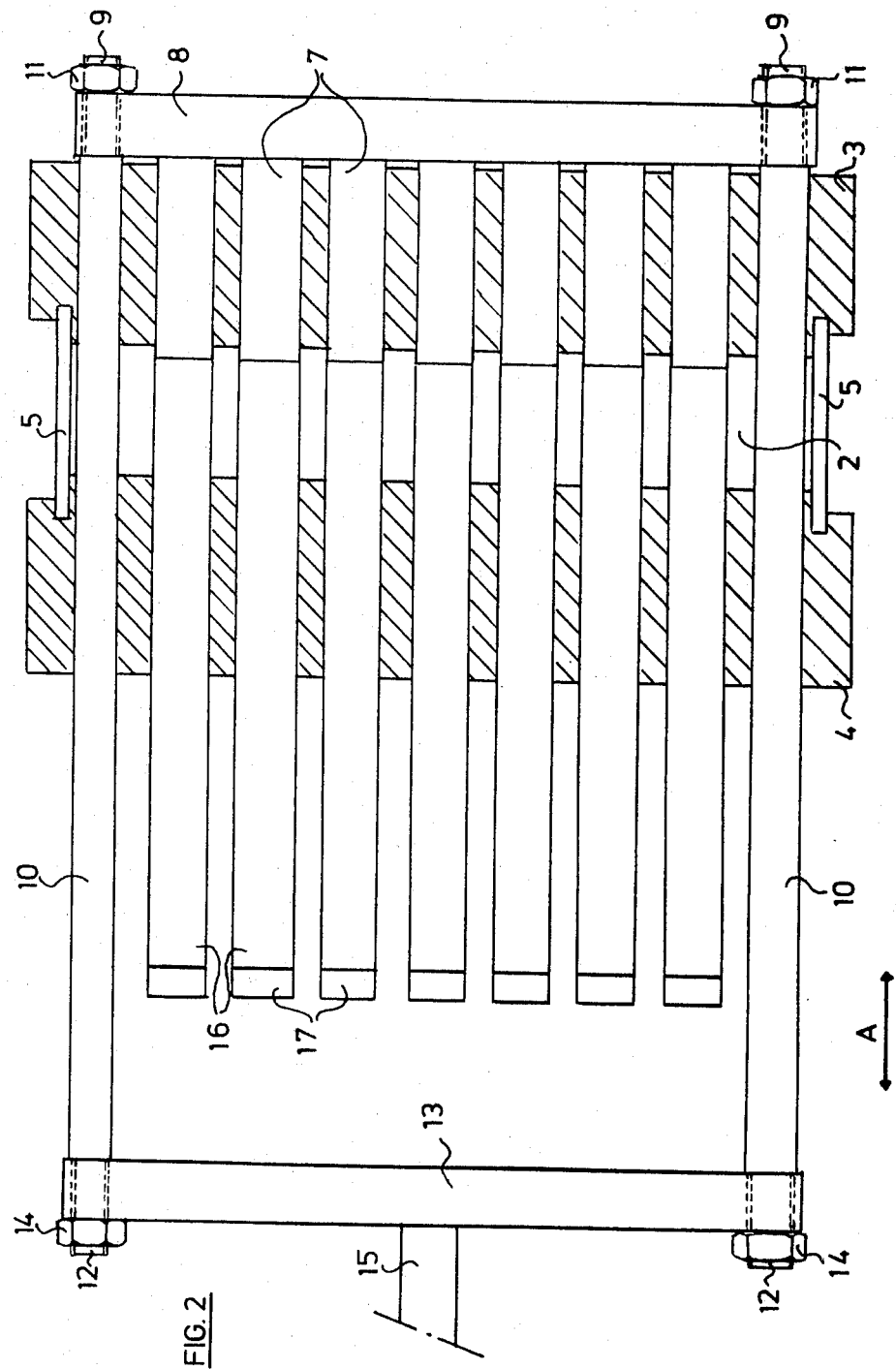
FIG. 2 is a sectional plan taken on the line II—II in FIG. 2, but with plungers of the device, and certain parts coupled therewith, being shown in positions differing from those shown in FIG. 1.

At the ends of the housing 1 the supply chamber 2 is closed by partitions 5 arranged in the housing (see FIG. 2).

Arranged on the open top of the supply chamber 2 is a hopper 6, through which dough-like material to be worked can be fed into the supply chamber 2.

In the particular embodiment shown, the sidewall 3 of the housing 1 has seven substantially horizontal bores or passages each of which accommodates, with close fit, a respective first plunger 7 as shown in FIG. 2. Corresponding ends of the plungers 7 projecting out of the housing 1, to the right hand side of FIG. 2, are fastened to a cross plate 8. The ends of the plate 8 have holes through which extend screwthreaded ends 9 of respective coupling rods 10. The diameter of each coupling rod 10 exceeds slightly that of the screwthreaded ends 9 of the coupling rods so that respective shoulders are formed at the transitions between the screwthreaded ends 9 and the main parts of the coupling rods 10, against which shoulders the coupling plate 8 is clamped with the aid of respective nuts 11 screwed onto the ends 9.

The coupling rods 10 extend parallel to the plungers 7 and through the horizontal bores, abovedescribed, in the housing 1. The ends of the coupling rods 10 remote from the coupling plate 8 also have respective screwthreads 12, corresponding with the screwthreaded ends 9. These screwthreaded ends 12 extend through holes in a coupling plate 13 which is clamped to the rods 10 with the aid of nuts 14. Coupled with the coupling rod 13 is a piston rod 15 of a setting ram (the rest of which is not shown).

The sidewall 4 of the housing 1 has bores registering with the bores accommodating the plungers 7, and receive with close fit, respective second plungers 16 which are aligned with the plungers 7.

The ends of the plungers 16 remote from the plungers 7 and projecting out of the housing 1 are provided with respective buffers 17, for example, of rubber or a suitable synthetic resin.

With the aid of the setting ram, part of which is formed by the piston rod 15 coupled with the plate 13, the framework formed by the plates 8 and 13 and the coupling rods 10 interconnecting said plates and by the plungers 7 supported by said framework can be reciprocated as is indicated in the figures by the arrow A.

FIG. 2 shows this framework in its extreme left-hand position.

In this position, the ends of the plungers 7 remote from the plate 8 are just located in the supply chamber 2, whereas the ends of the plungers 16 facing the plungers 7 are in contact with the ends of the plungers 7 located in the supply chamber 2. The construction is such that the free ends of the buffers 17 fastened to the plungers 16 are located at a given distance from the plate 13.

Before starting operation, the supply chamber 2 and the hopper 6 are filled with material to be worked and the hopper 6 will comprise means (not shown) for ensuring regular supply of the material from the hopper to the supply chamber 2, preferably in a manner such that the material in the supply chamber 2 is subjected to a given pressure.

When the framework 8, 10, 13, with the plungers 7, 16 supported thereby, moves to the right out of the position shown in FIG. 2, the freely-disposed plunger 16 will initially maintain their positions so that an open space is formed between the proximal ends of the plungers 7 and 16. The material contained in the supply chamber 2 will enter between these proximal head faces of the plungers 7 and 16 and thus urge the plungers 16 to the left, viewed in FIG. 2, until the buffers 17 come into contact with the coupling rod 13 moving to the right so that the coupling rod 13 forms a stop for the plungers 16. In the meantime the driven plungers move further to the right and the material contained in the supply chamber 2 will pass through the passages released by the plungers 7 and follow the plungers 7. Subsequently, the plungers 16, then being in contact with the rod 13 via the buffers 17, will be moved to the right, viewed in FIG. 2, and be urged after the plungers 7 into the passages released by the plungers 7 before the ends facing the plungers 16 have left the passages concerned.

The passages initially occupied by the plungers 7 are then again cut off from the supply chamber 2 and upon further movement to the right the position of the plungers shown in FIG. 1 is finally reached, in which the proximal ends of the plungers 7 and 16 are located outside the housing 1 at a distance from one another, whilst between these two proximal ends there is located a formed product 18, the diameter of which corresponds with the diameter of the openings in the housing or the diameters respectively of the plungers 7 and 16 which fit closely in said openings. The length of the product 18 corresponds to the distance between the free ends of the buffers 17 and the rod 13 in the position of the device shown in FIG. 2.

Subsequently, the product 18 can be removed from between the plungers 7 and 16, for example by means of two wires 19 and 20 shown schematically in FIG. 1 and extending at right angles to the direction of the lengths of the plungers 7 and 16 and supported by an arm 21 moving up and down in synchronism with the movement of the plungers 7 and 16. Of course, other members, for example plate-shaped elements, may be used to push-out or strip away the formed product 18 from between the confronting ends of the plungers 7 and 16. It is preferred to arrange a conveyor belt or the like (not shown) at the side of the housing 1, from the formed products 18 to be deposited there and conducted away.

After removal of the formed products 18 from between the proximal ends of the plungers 7 and 16, the drive of the framework formed by the parts 8, 13 and 10 is reversed by means of the setting ram 15 so that this framework moves to the left as considered in the drawings. Initially the plungers 16 will remain still and the plungers 17 will move to the right. When the proximal or confronting ends of the plungers 7 and 16 come into contact with one another, the plungers 16 will be moved along by the plungers 7 and be slid into the positions shown in FIG. 2. Since the plungers 7 and 16 are urged, whilst their ends are in contact with one another, into and through the openings in the right-hand wall 3 of the housing 1, air is prevented from penetrating into the supply chamber 2 during this return movement.

When the device is back in its position shown in FIG. 2, the cycle described above can be repeated. It will be obvious that by use of the device according to the invention objects of accurately equal dimensions can be made, whilst these objects invariably leave the device at a given location which considerably facilitates subsequent transport and processing of the objects.

I claim:

1. A device for the manufacture of rod-shaped objects of dough-like material, for example, croquettes, characterized in that the device comprises a supply chamber for receiving the material and communicating with a passage located in a housing in which a first plunger is adapted to reciprocate, said first plunger being displaceable between a first position in which it completely fills the passage and a second position in which it is located outside the passage and the supply chamber, whilst a second plunger is also adapted to reciprocate in line with the first plunger and is displaceable between a first position in which the end of the second plunger facing the first plunger is located in the supply chamber and a second position in which said end of the second plunger has passed through said passage and is also located outside the supply chamber, and a drive member fixed to said first plunger for moving it from its first to its second position, the drive member including means for moving the second plunger in the same direction as the first plunger after a given time delay, the second plunger being responsive to the displacement of the first plunger from its second to its first position for moving the second plunger from its second to its first position.

2. A device as claimed in claim 1 characterised in that the second plunger is freely displaceable in the housing between the first plunger and a stop connected with the first plunger the distance between the end of the first plunger facing the second plunger and the stop exceeding the length of the second plunger.

3. A device as claimed in claim 1 or 2 characterised in that it comprises a plurality of the first plungers lying side-by-side and fastened to a first member of a reciprocatory framework an opposite member of which constitutes a stop member for the respective second plungers co-operating with the first plungers.

4. A device as claimed in claim 1, characterised in that reciprocatory means are at the side of the housing, which reciprocatory means are adapted to move between the proximal ends of the plungers when located outside the housing.

5. A device as claimed in claim 1, characterized in that said drive member includes two bars disposed in essentially parallel relationship to each other and fixed together for unitary movement, the first plunger being fixed to the first bar and the second bar being disposed for contacting an end of said second plunger after the drive member initiates moving said first plunger from its first to its second position, the time period between initiating movement of said first plunger and contacting said second plunger being equal to said given time delay.

6. A device as claimed in claim 5, characterized in that the second plunger is freely displaceable in the housing between the first plunger and said second bar, the second plunger cooperating with the second bar for movement in one direction and cooperating with said first plunger for moving in the opposite direction.

7. A device as claimed in claim 6, characterized in that said supply chamber receives the material under pressure and the material initially displaces said second plunger from its first position to a position in which an end thereof contacts said second bar shortly after said drive member initiates moving said first plunger from its first position towards its second position.

* * * * *